(12) United States Patent
Valenti et al.

(10) Patent No.: US 10,141,728 B1
(45) Date of Patent: Nov. 27, 2018

(54) VERTICAL CABLE MANAGER WITH SLAM-SHUT DOOR

(71) Applicant: Panduit Corp., Tinley Park, IL (US)

(72) Inventors: Joshua A. Valenti, Novi, MI (US);
Kevin M. Zumbek, Chicago, IL (US);
Jason O'Young, Tinley Park, IL (US);
Robert L. Fritz, Elwood, IL (US);
Nathan A. Gleghorn, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/649,821

(22) Filed: Jul. 14, 2017

(51) Int. Cl.
*H02G 3/04* (2006.01)

(52) U.S. Cl.
CPC ......... *H02G 3/0418* (2013.01); *H02G 3/0437* (2013.01); *H02G 3/0456* (2013.01); *H02G 3/0493* (2013.01)

(58) Field of Classification Search
CPC .............................................. B60R 2011/0021
USPC ....................................................... 174/651
See application file for complete search history.

(56) References Cited

U.S. PATENT DOCUMENTS

| | | |
|---|---|---|
| 6,489,565 B1 | 12/2002 | Krietzman et al. |
| 6,605,782 B1 | 8/2003 | Krietzman et al. |
| 7,119,282 B2 | 10/2006 | Krietzman et al. |
| 7,178,292 B2 | 2/2007 | Yamada |
| D539,228 S | 3/2007 | Toikka et al. |
| 7,285,027 B2 | 10/2007 | McGrath et al. |
| D555,641 S | 11/2007 | Levesque et al. |
| 7,385,141 B2 | 6/2008 | Keith et al. |
| 7,458,859 B2 | 12/2008 | McGrath et al. |
| D611,326 S | 3/2010 | Alaniz et al. |
| 7,695,323 B2 | 4/2010 | McGrath et al. |
| 7,762,405 B2 | 7/2010 | Vogel et al. |
| 7,857,670 B2 | 12/2010 | McGrath et al. |
| D630,167 S | 1/2011 | Donowho |
| 7,893,356 B2 | 2/2011 | Garza et al. |
| 7,973,242 B2 | 7/2011 | Jones et al. |
| 7,999,183 B2 | 8/2011 | Garza et al. |
| D651,570 S | 1/2012 | Donowho et al. |
| 8,138,419 B2 | 3/2012 | Garza et al. |
| 8,162,699 B2 | 4/2012 | McGrath et al. |
| 8,220,881 B2 | 7/2012 | Keith |
| 8,263,867 B2 | 9/2012 | Garza et al. |
| 8,273,989 B2 | 9/2012 | Garza et al. |
| 8,330,043 B2 | 12/2012 | Alaniz et al. |

(Continued)

FOREIGN PATENT DOCUMENTS

EP    2564481 B1    9/2015

*Primary Examiner* — Hoa C Nguyen
*Assistant Examiner* — Stanley Tso
(74) *Attorney, Agent, or Firm* — Christopher S. Clancy; James H. Williams; Aimee E. McVady

(57) ABSTRACT

A vertical cable manager includes a base frame and a door. The base frame has upper and lower support legs and upper and lower crossbars between the support legs. The door has retractable hinge pins at corners of the door. The crossbars have hinge rod receptacles to receive respective hinge pins and elastic latch members having a flexible arm and a catch portion. The catch portions secure the hinge pins in the hinge rod receptacles with the door closed and are deflectable through elastic deformation of the flexible arm to allow travel of the hinge pins through the hinge rod receptacles and past the catch portions when the door is moved from an open to a closed position.

16 Claims, 22 Drawing Sheets

(56) References Cited

U.S. PATENT DOCUMENTS

| | | | |
|---|---|---|---|
| 8,363,998 | B2 | 1/2013 | Newman et al. |
| 8,435,086 | B2 | 5/2013 | McGrath et al. |
| 8,558,113 | B2 | 10/2013 | Krietzman et al. |
| 8,881,916 | B2 | 11/2014 | Vogel et al. |
| 8,966,821 | B2 | 3/2015 | Walker et al. |
| 9,054,506 | B2 | 6/2015 | Krietzman et al. |
| 9,303,440 | B2 | 4/2016 | Larsen et al. |
| 9,350,146 | B2 | 5/2016 | Krietzman et al. |
| 9,577,414 | B2 | 2/2017 | Krietzman et al. |
| 2010/0290752 | A1* | 11/2010 | Newman ................ H04Q 1/035 385/135 |
| 2011/0265384 | A1* | 11/2011 | Fritz ................... H02G 3/0418 49/394 |
| 2012/0291906 | A1* | 11/2012 | Moore .................. B60T 11/046 138/134 |
| 2012/0309218 | A1* | 12/2012 | Annecke ............ H01R 13/6273 439/352 |
| 2014/0075844 | A1* | 3/2014 | Walker ................. E05D 7/1061 49/208 |
| 2015/0191947 | A1* | 7/2015 | Philippe ................. E05B 77/38 292/195 |

* cited by examiner

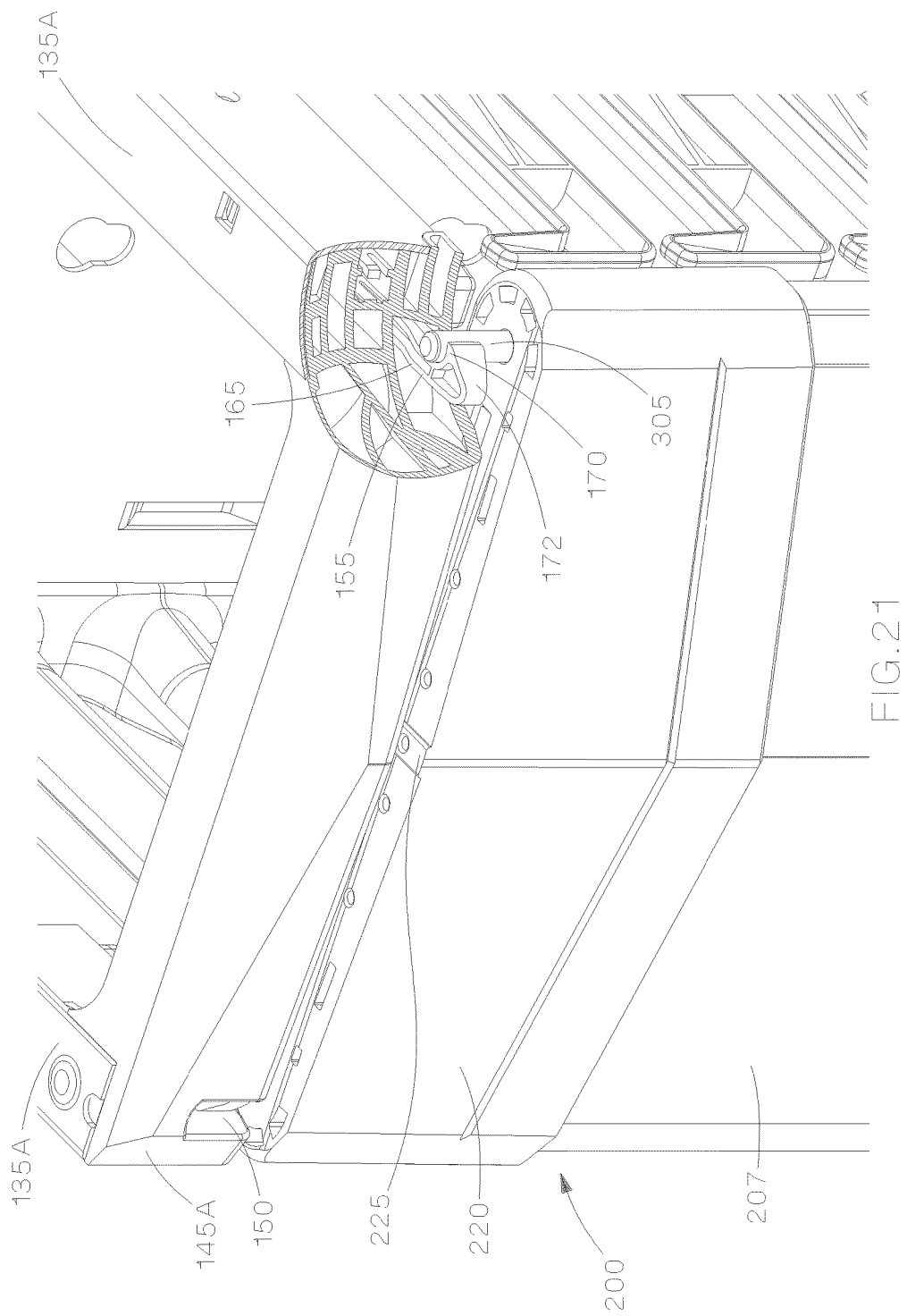

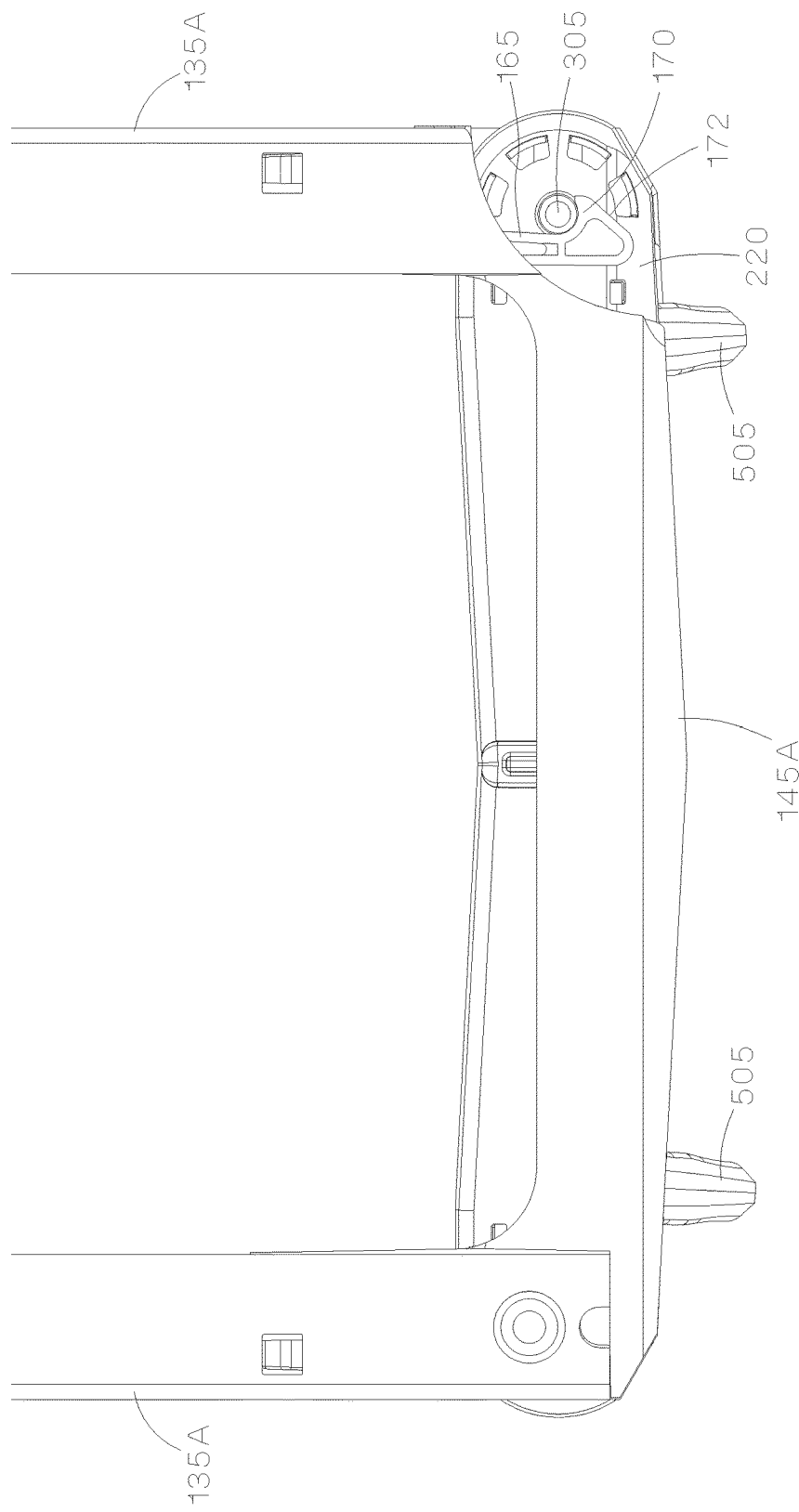

VERTICAL CABLE MANAGER WITH SLAM-SHUT DOOR

FIELD OF THE INVENTION

The present invention generally relates to vertical cable managers, and, more specifically, to vertical cable managers having slam-shut doors.

BACKGROUND

Vertical cable managers having doors to cover and protect the cables traversing through the manager are well known in the art. However, many vertical cable managers that have doors do not have doors with a slam-shut functionality or, if they do have slam-shut functionality, have complex or inefficient designs that can contain a large number of components and increased assembly costs.

Therefore, there is a need for a vertical cable manager with slam-shut doors that have a simplified, efficient design with less components and reduced assembly cost.

SUMMARY

In one example, a vertical cable manager comprises a base frame and a door. The base frame has a backbone, first and second upper support legs attached to a first end of the backbone, first and second lower support legs attached to a second end of the backbone, opposite the first end, an upper crossbar attached between the first and second upper support legs, and a lower crossbar attached between the first and second lower support legs. The door has a door panel and hinge pin assemblies, each including a retractable hinge pin, secured to the door panel and positioned at respective corners of the door panel. The upper and lower crossbars each have first and second hinge rod receptacles to receive respective hinge pins and first and second elastic latch members, which each comprise a base portion that connects to the crossbar, a flexible arm extending from the base portion, and a catch portion extending generally perpendicular from the flexible arm and disposed at a distal end of the flexible arm, opposite the base portion. The catch portions secure the hinge pins in the hinge rod receptacles with the door in a closed position and are deflectable through elastic deformation of the flexible arm to allow travel of the hinge pins through the hinge rod receptacles and past the catch portions when the door is moved from an open to a closed position.

In another example, a base frame for a vertical cable manager comprises a backbone, first and second upper support legs attached to a first end of the backbone, first and second lower support legs attached to a second end of the backbone, opposite the first end, an upper crossbar attached between the first and second upper support legs, and a lower crossbar attached between the first and second lower support legs. The upper and lower crossbars each have first and second hinge rod receptacles to receive respective retractable hinge pins of a door and first and second elastic latch members, which each have a base portion that connects to the crossbar, a flexible arm extending from the base portion, and a catch portion extending generally perpendicular from the flexible arm and disposed at a distal end of the flexible arm, opposite the base portion. The catch portions secure the hinge pins in the hinge rod receptacles with the door in a closed position and are deflectable through elastic deformation of the flexible arm to allow travel of the hinge pins through the hinge rod receptacles and past the catch portions when the door is moved from an open to a closed position.

In another example, a door for a vertical cable manager comprises a door panel, first and second opposing hinge pin assemblies, a door handle assembly, and a cable assembly. The hinge pin assemblies are secured to the door panel and are positioned at respective corners of the door panel. Each hinge pin assembly includes a retractable hinge pin to be received by a respective hinge rod receptacle in a crossbar of a vertical cable manager. The cable assembly is connected at opposite ends to the opposing hinge pin assemblies and extends through the door handle assembly, such that rotation of the door handle assembly pulls the cable assembly in a direction away from the hinge pin assemblies, which moves the retractable hinge pins of the respective hinge pin assemblies from an extended position to a retracted position.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

FIG. 21 is an enlarged perspective partial cutaway view of a portion of the vertical cable manager of FIG. 1 with the door in a closed position; and FIG. 22 is a top view of the portion of the vertical cable manager in FIG. 21.

DETAILED DESCRIPTION

The examples shown and described herein provide a vertical cable manager having a base frame and at least one door that provide a slam-shut or push-to-close feature that provides a positive affirmation that the door is latched closed. The slam-shut feature of the examples have a simplified, efficient, and lower cost design that uses less components and reduces assembly cost of the vertical cable manager.

Figure 1:
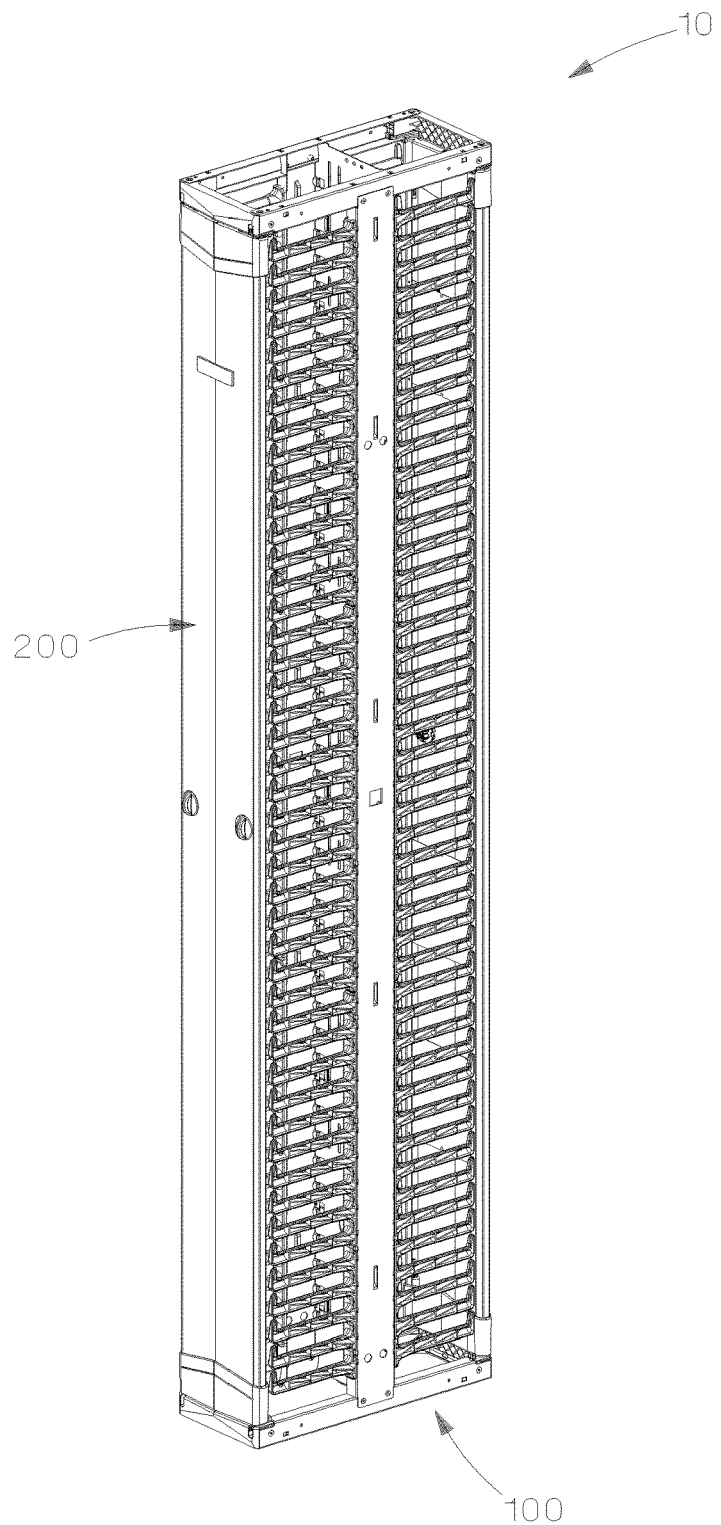
FIG. 1 is a top front perspective view of an example vertical cable manager according to an embodiment of the present invention.
Figure 2:
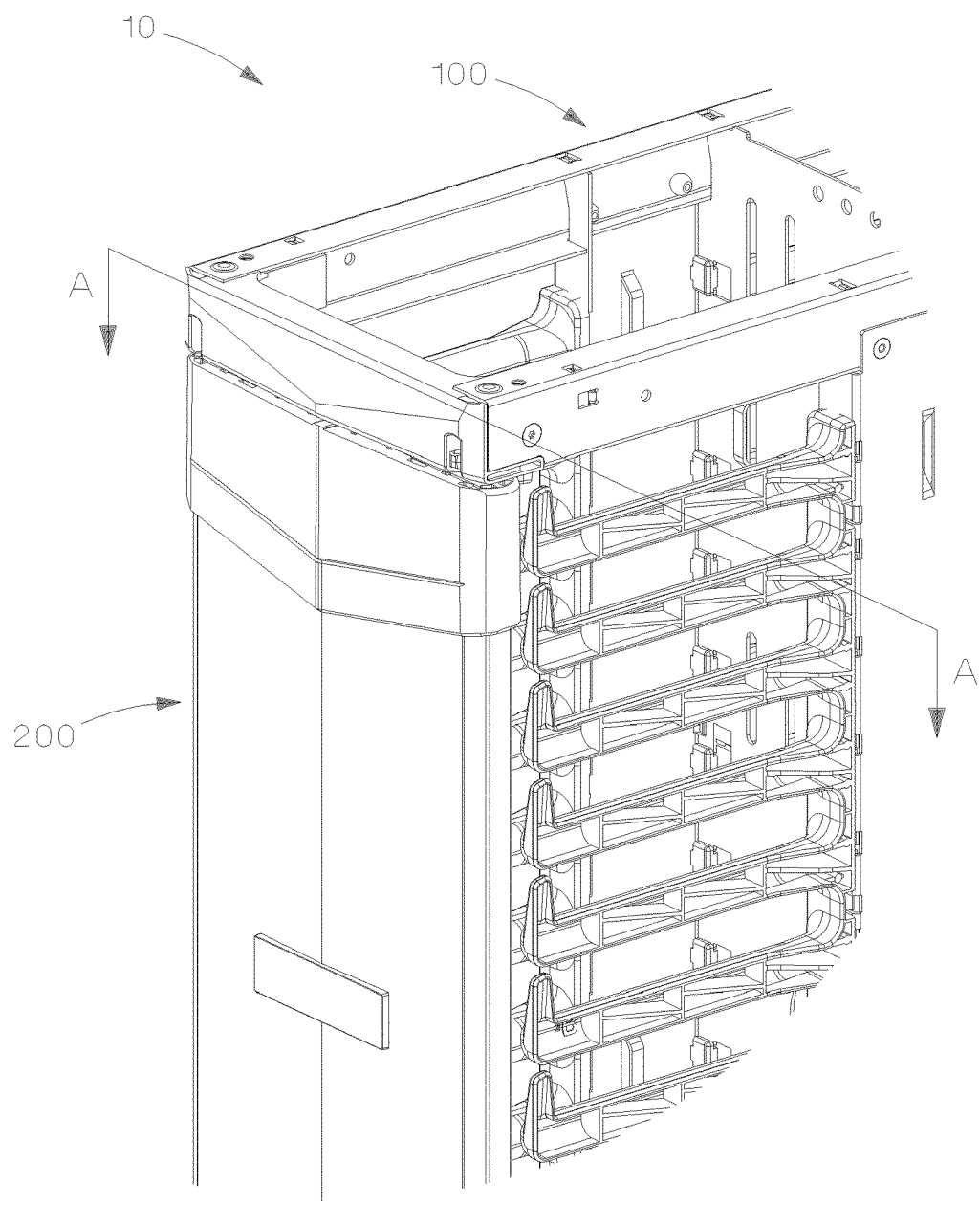
FIG. 2 is an enlarged top front perspective view of a portion of the vertical cable manager of FIG. 1.

As shown in FIGS. 1 and 2, an example vertical cable manager 10 with a slam-shut door feature generally includes a base frame 100 (FIGS. 12-15) and a door 200 (FIGS. 3-11). Typically, the vertical cable manager includes two doors.

Referring to FIGS. 12-15, base frame 100 generally includes backbone 105, upper and lower support legs 135A, 135B, and upper and lower crossbars 145A, 145B, and can also include cable finger units 175. Backbone 105 includes a generally planar back panel 110 and side panels 115 that are positioned on opposing sides of back panel 110 and extend generally perpendicular to back panel 110. Backbone 105 is preferably metallic and can be formed by a single, unitary piece of material that is shaped to form back panel 110 and side panels 115. Alternatively, back panel 110 and side panels 115 can be formed as separate parts that are attached together in any manner desired, such as by tabs, rivets, threaded members, welds, etc.

Upper support legs 135A are attached to a first end, or top end, of respective side panels 115 of backbone 105 and lower support legs 135B are attached to an opposing second end, or bottom end, of respective side panels 115 of backbone 105 via rivets 610, or any other desired attachment method. Upper and lower support legs 135A, 135B each include support tab apertures 140 (see FIG. 15) that receive support tabs 130 on side panels 115 of backbone 105 to increase rigidity between backbone 105 and upper and lower support legs 135A, 135B.

Figure 15:
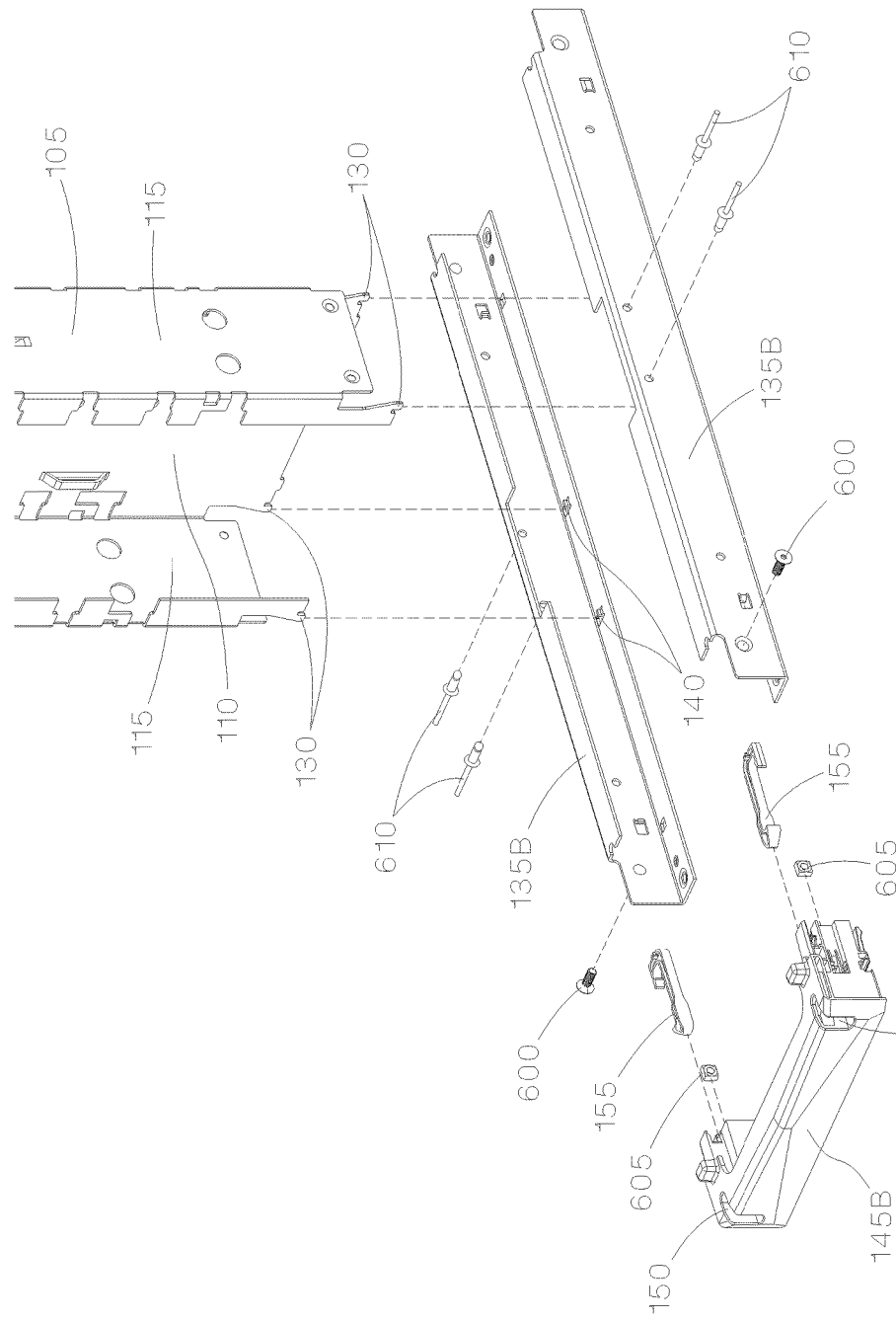
FIG. 15 is an exploded view of the portion of the base frame of FIG. 13 with the cable finger units removed.
Figure 16:
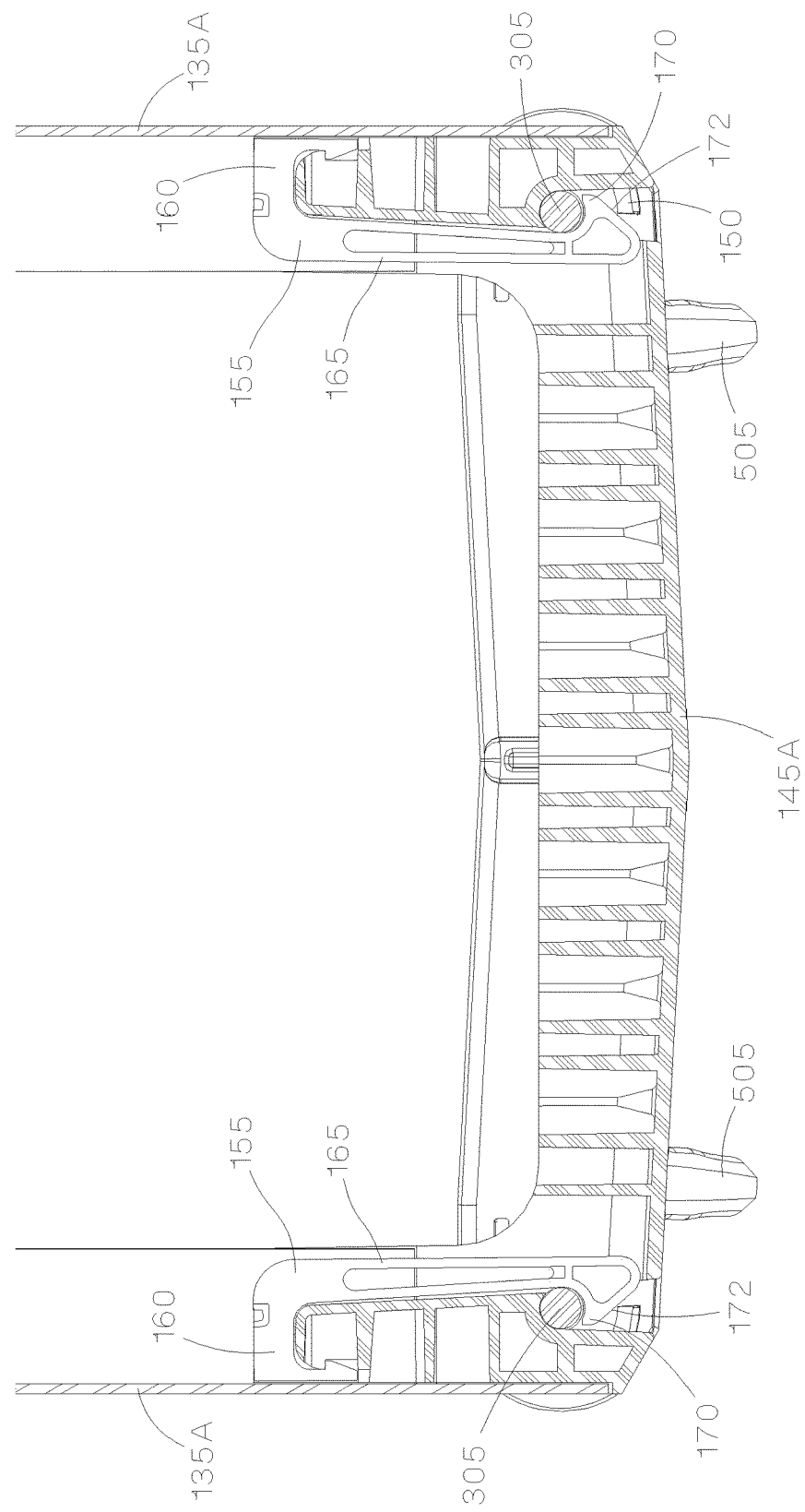
FIG. 16 is a cross-sectional view taken along line A-A in FIG. 2.

Upper and lower support legs 135A, 135B have a geometry on the ends that receive upper and lower crossbars 145A, 145B, which can serve as support surfaces for door 200. Upper crossbars 145A are attached between opposing ends of upper support legs 135A and lower crossbars 145B are attached between opposing ends of lower support legs 135B with screws 600 and nuts 605, which are captured within crossbars 145A, 145B. Upper and lower crossbars 145A, 145B can be attached to upper and lower support legs 135A, 135B in any manner desired, however, it is preferable that crossbars 145A, 145B are removable to facilitate installation of cables. Each upper and lower crossbar 145A, 145B includes hinge rod receptacles 150, which in the example shown are slots formed in crossbars 145A, 145B, that receive hinge pins 305 (see FIG. 4) and cooperate with elastic latch members 155 to hold hinge pins 305. As best seen in FIGS. 15 and 16, latch members 155 have a base portion 160 that is used to connect latch members 155 to crossbars 145A, 145B through a snap fit or other connection methods. A flexible arm 165 extends from base portion 160 and is elastically deformable to allow latch member 155 to flex and deflect through engagement with a hinge pin 305 when door 200 moves from an open to a closed position, as described in detail below. Catch portion 170 extends from flexible arm 165 at a distal end of flexible arm 165, opposite base portion 160, is generally perpendicular to flexible arm 165, and secures hinge pins 305 in hinge rod receptacles 150 of crossbars 145A, 145B when door 200 is in a closed position, as described in detail below. Latch members 155 are made of an elastic material that returns to a default closed position unless latch members 155 are otherwise deflected by a hinge pin 305.

Cable finger units 175 can be mounted on front flange 116 or back panel 110 to allow the routing and organization of cables in vertical cable manager 10. Each cable finger unit 175 can have a base 190 and a plurality of fingers 195 that extend from base 190. In the example shown, each finger 195 has a generally L-shaped configuration to retain cables that are routed between fingers 195. In the example shown, cable finger units 175 each have fifteen (15) fingers 195, which requires less cable finger units 175 to cover base frame 100, thus reducing cost, but can include any number of fingers desired. In addition, fingers 195 of cable finger units 175 have an arcuate surface that faces inwards to provide a bend radius for the cables and a flat outer surface. Therefore, cable finger units 175 on opposing left and right sides of base frame 100 would be a mirrored version of each other. In addition, in the example shown, cable finger units 175 are mounted on base frame 100 to provide forward extending and rearward extending fingers. However, cable finger units 175 can be mounted in any combination and direction desired. For example, cable finger units 175 could only be mounted to base frame 100 to provide forward extending fingers.

Figure 14:
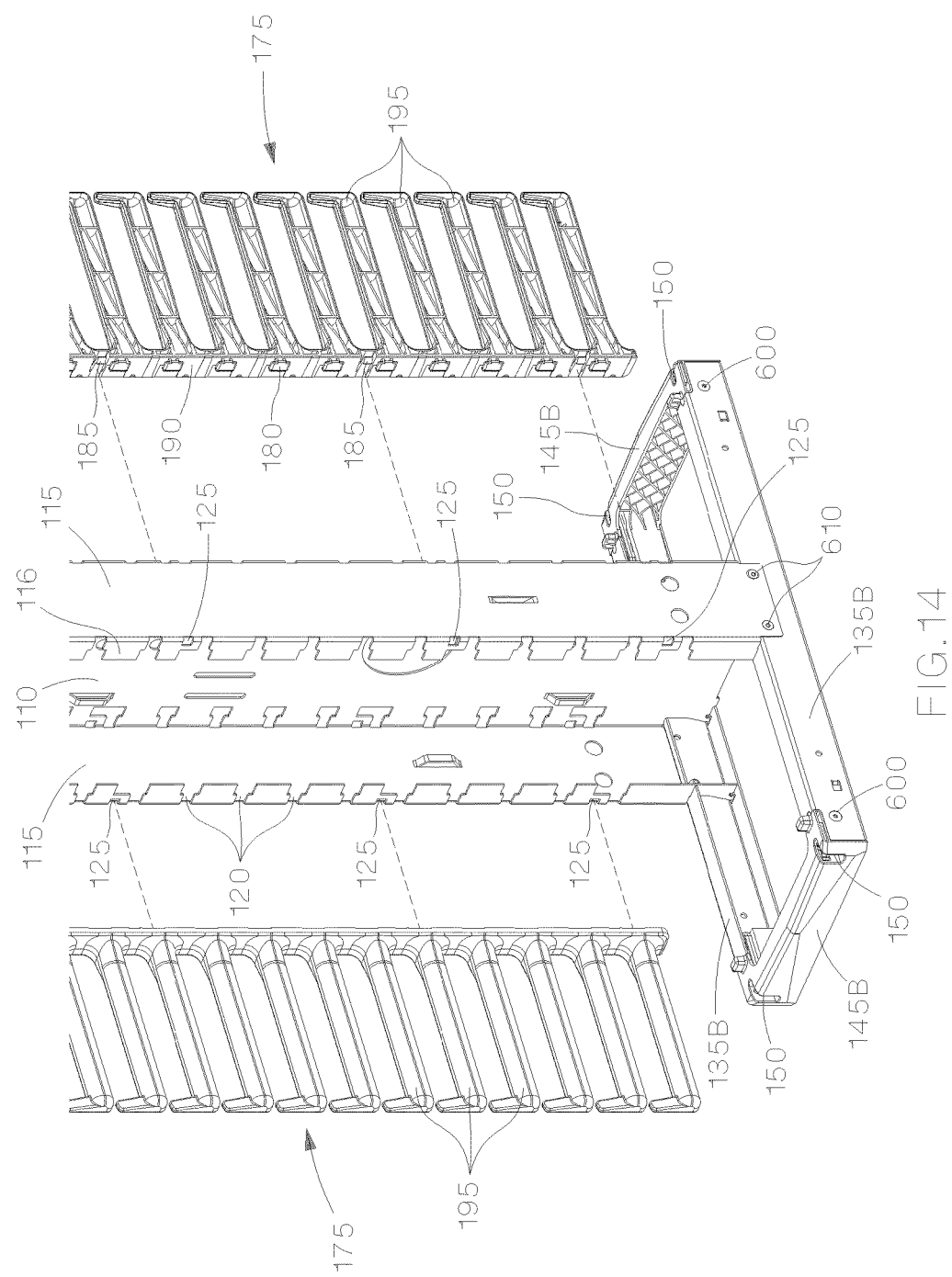
FIG. 14 is a partial exploded view of the portion of the base frame of FIG. 13.

As can best be seen in FIG. 14, cable finger units 175 can be positioned on backbone 105 of base frame 100 through a plurality of T-shaped protrusions 180 formed on cable finger units 175 that extend from the back of base 190, opposite fingers 195. Cable finger units 175 can also be secured to backbone 105 through one or more flexible snap members 185 formed on the back of cable finger units 175. T-shaped protrusions 180 on cable finger units 175 are configured to engage a plurality of slots 120 formed in backbone 105 of base frame 100 to allow cable finger units 175 to be properly aligned and positioned and flexible snap members 185 are configured to engage and lock into apertures 125 formed in backbone 105 of base frame 100 to removably secure cable finger units 175. Thus, no tools are required to position and install cable finger units 175, which simplifies assembly and installation and reduced costs.

Figure 3:
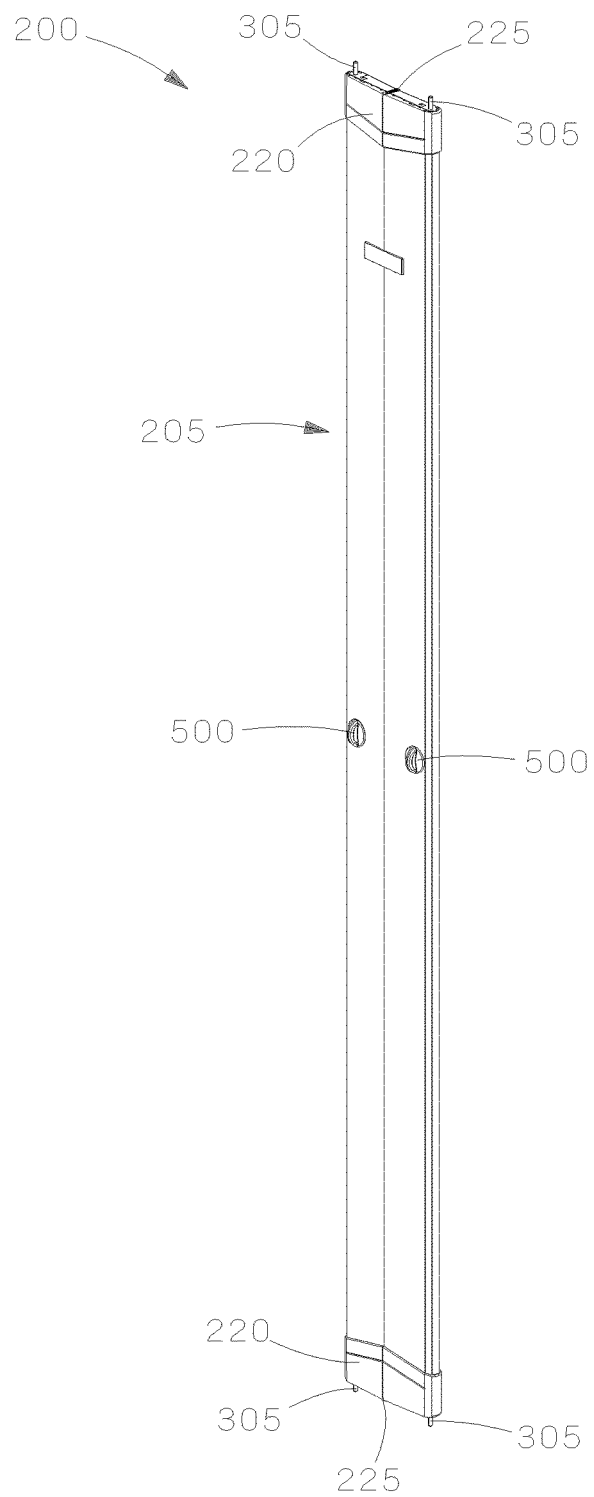
FIG. 3 is a top front perspective view of the door of the vertical cable manager of FIG. 1.
Figure 4:
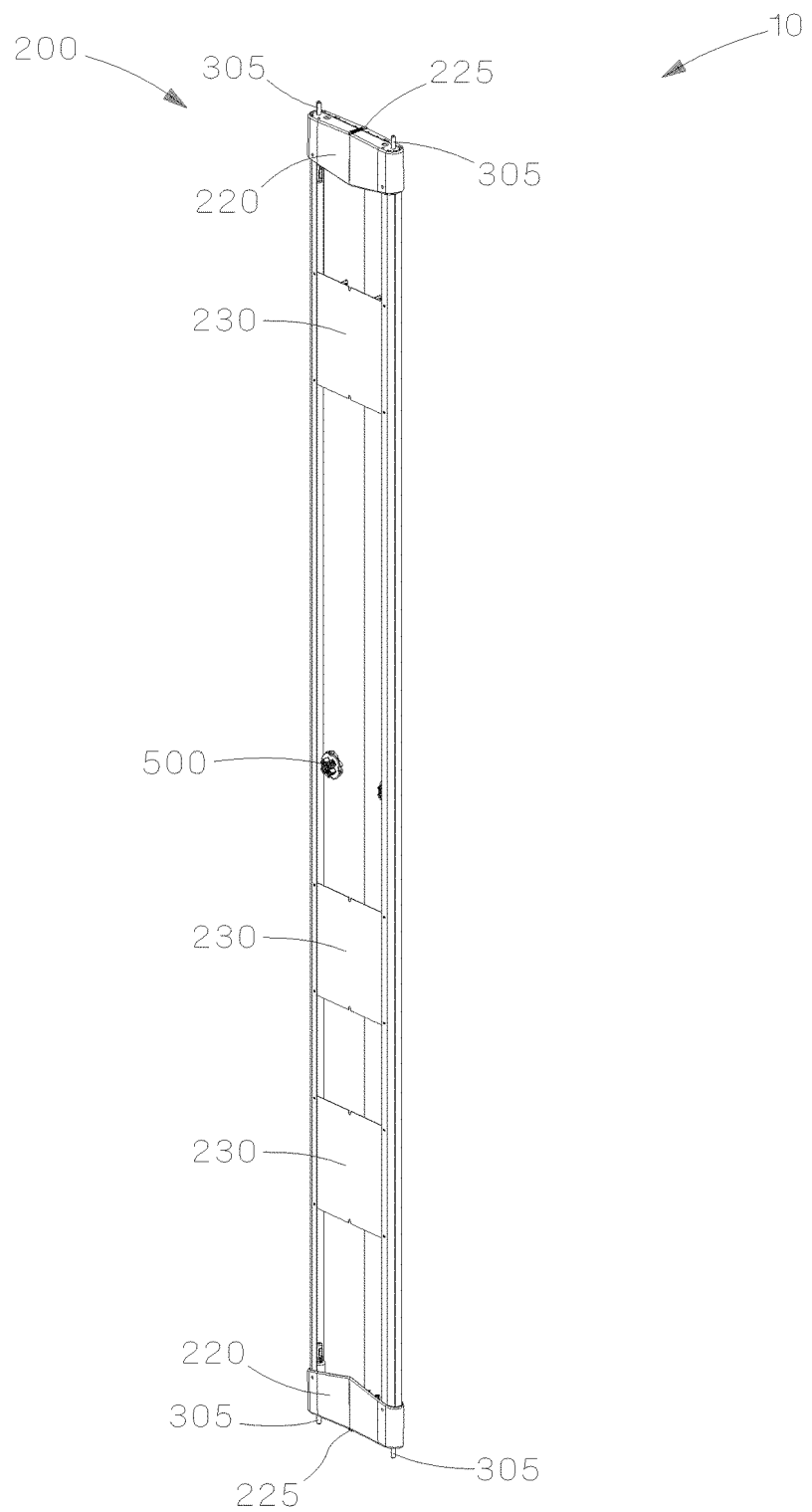
FIG. 4 is a top rear perspective view of the door of FIG. 3.
Figure 5:
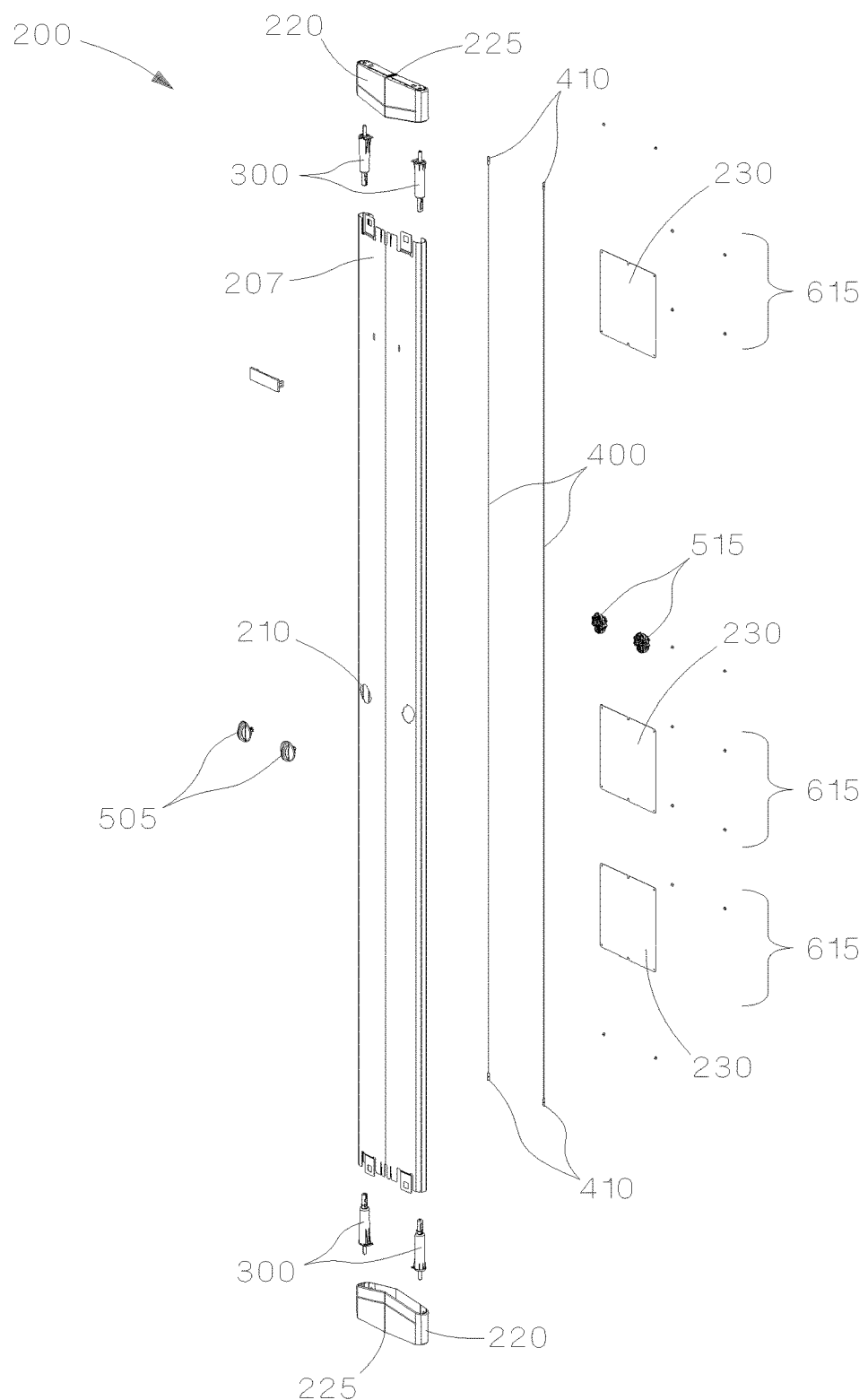
FIG. 5 is an exploded top front perspective view of the door of FIG. 3.

Referring to FIGS. 3-5, door 200 generally includes door panel 205, hinge pin assemblies 300 (FIGS. 8 and 10-11), cable assemblies 400, and door handle assemblies 500 (FIGS. 6-9). Door panel 205 can include door skin 207 and covers 220 connected at opposing top and bottom ends of door skin 207. Covers 220 each have center engagement rib 225, which is the first point of contact when door 200 is moved from an open to closed position. When center engagement ribs 225 contact crossbars 145A, 145B, door 200 wedges upwards and reduces friction near the closing area near hinge pins 305. Covers 220 can also include distinct styling features, such as a pointed front face, angular grooves, and transition edges that match corresponding transition edges on door skin 207. In the example shown, braces 230 can also be secured to door skin 207 to add stiffness to door 200 and hide cable assemblies 400 when cable assemblies 400 are not in tension. Any number of braces 230 can be secured to door skin 207 with rivets 615, or by any other means desired.

Figure 8:
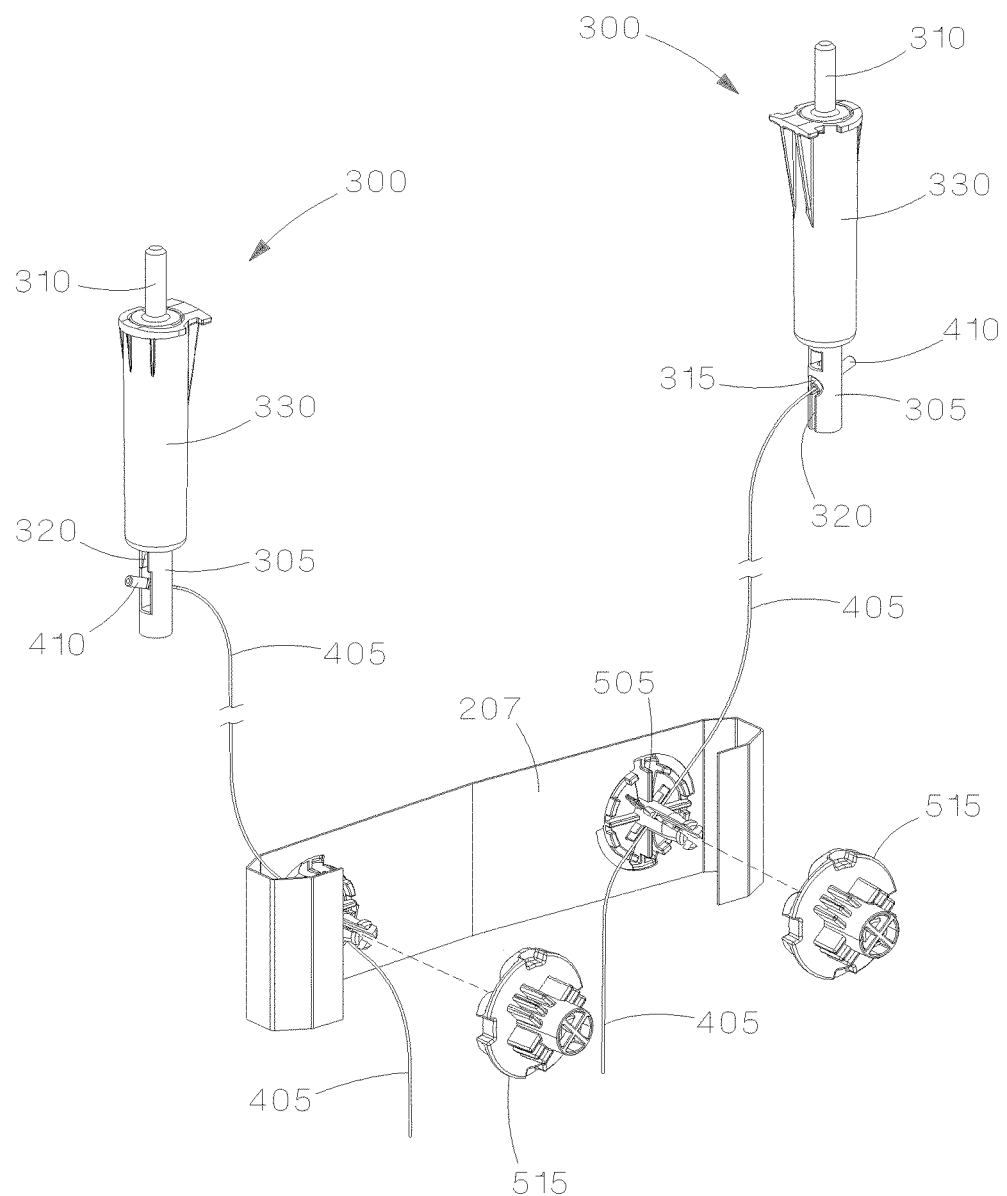
FIG. 8 is an exploded top rear perspective view of the door handle assemblies and a portion of the cable assemblies of the door of FIG. 3.
Figure 9:
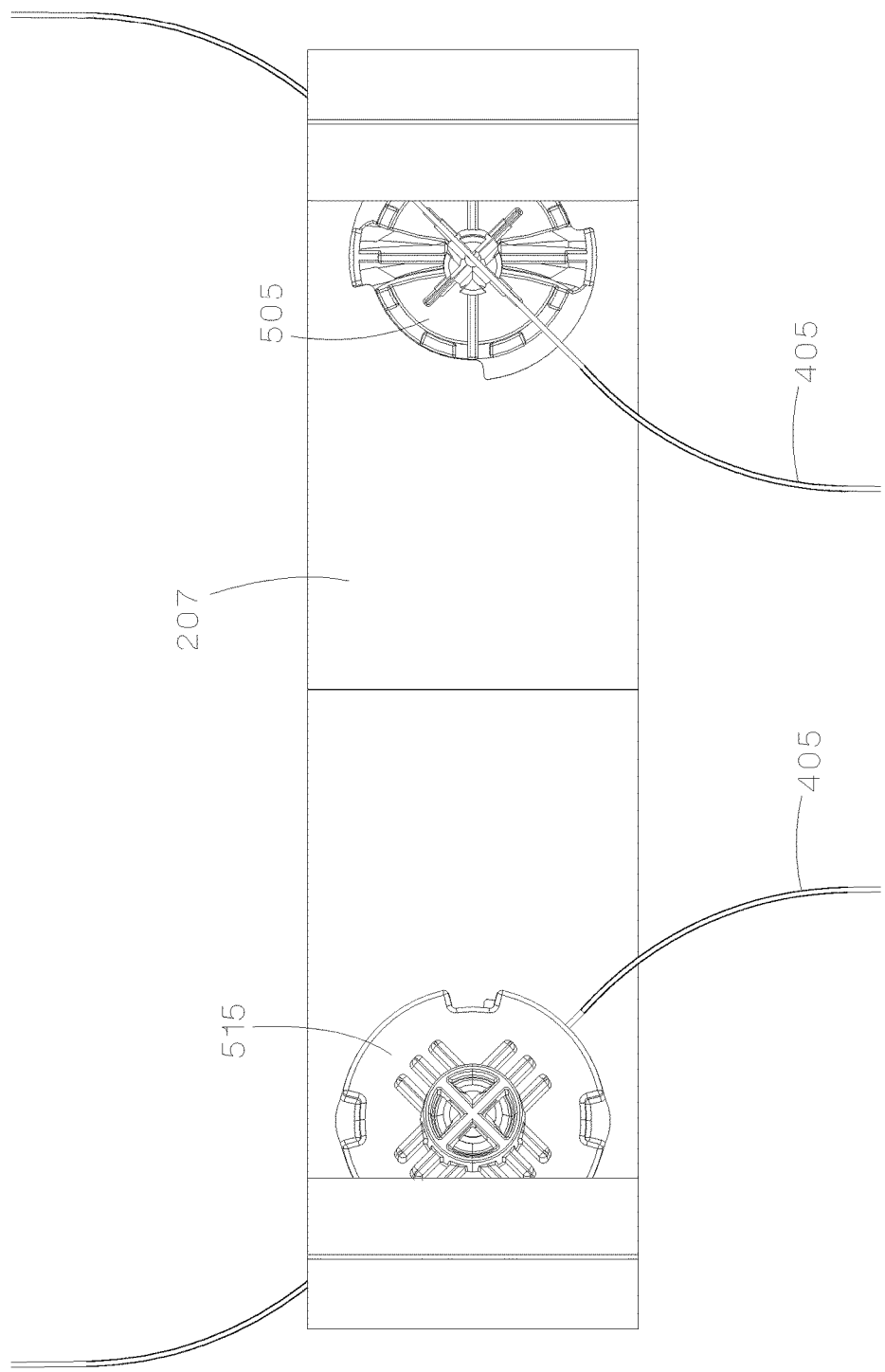
FIG. 9 is an enlarged rear plan view of the door handle assemblies of the door of FIG. 3.
Figure 10:
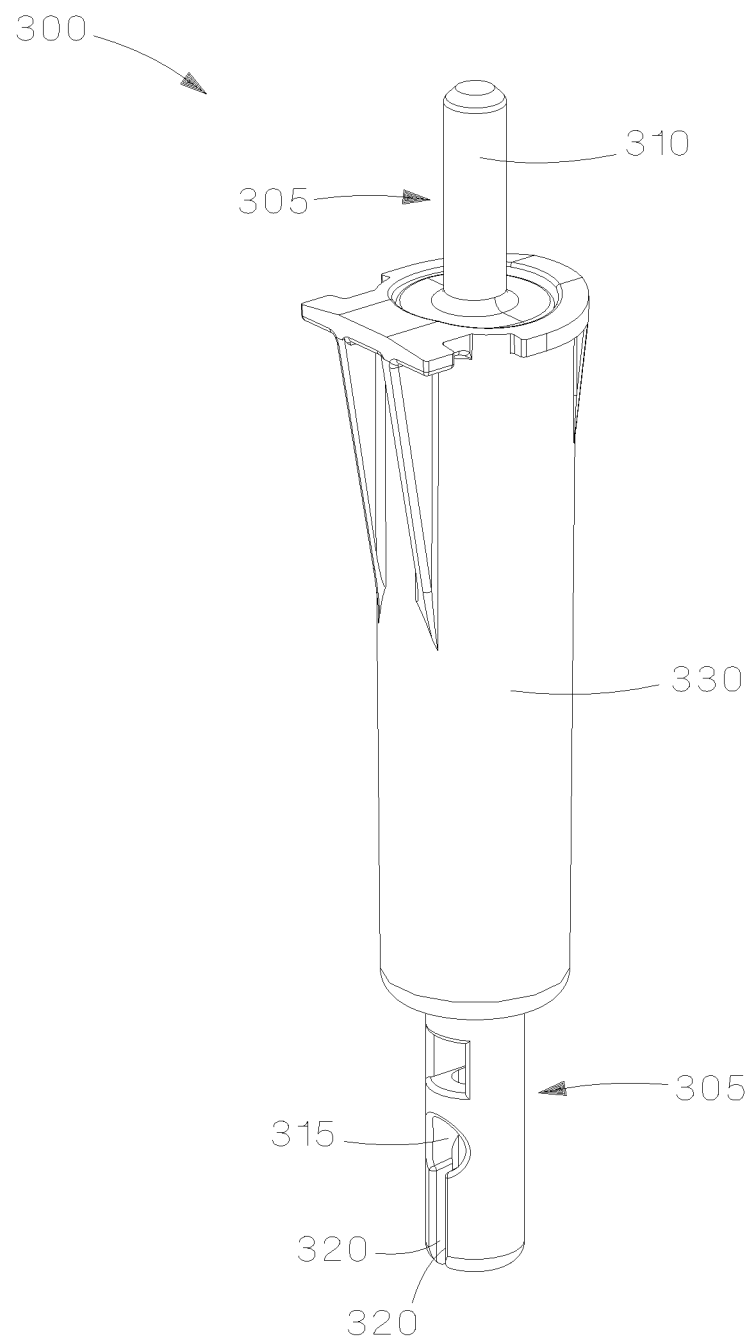
FIG. 10 is a top rear perspective view of a hinge pin assembly of the door of FIG. 3.
Figure 11:
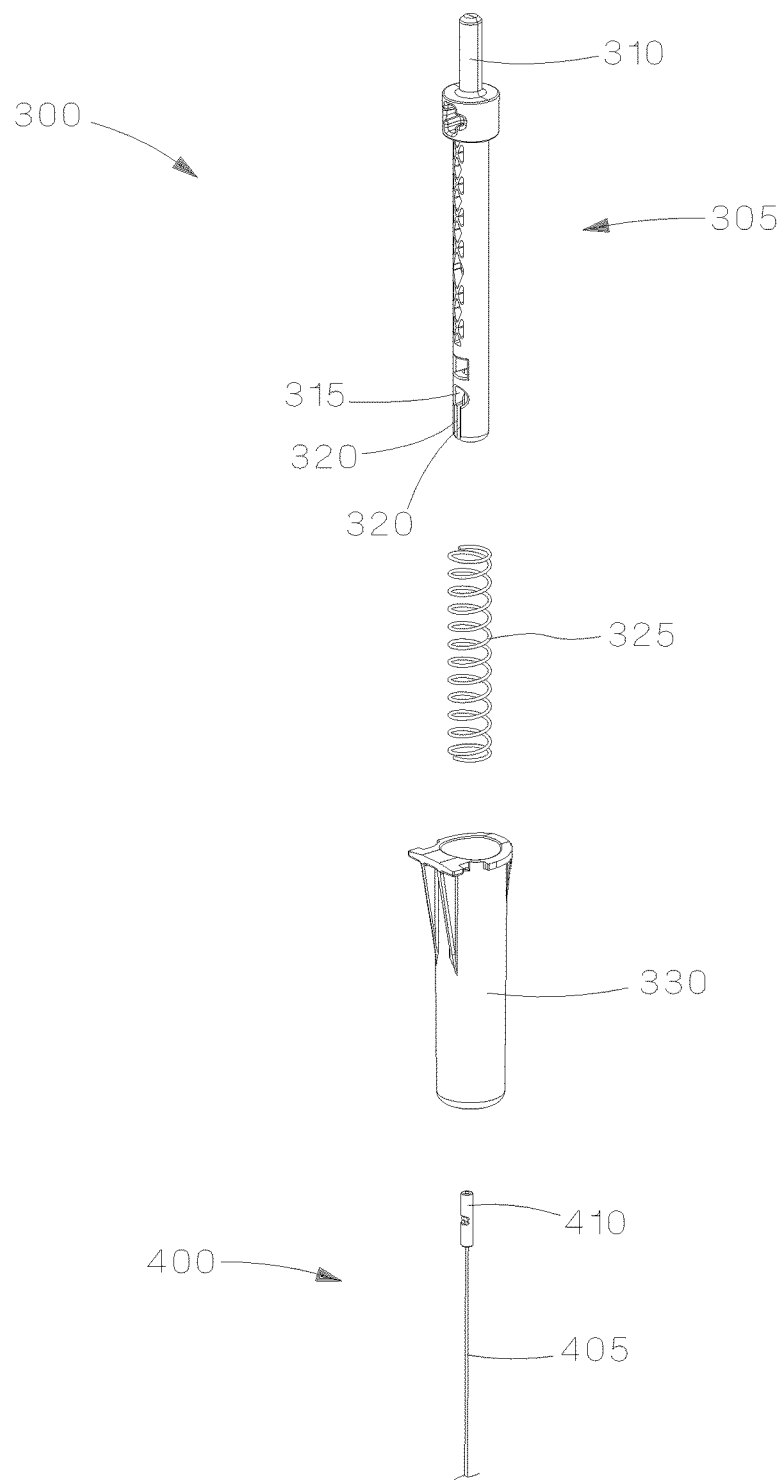
FIG. 11 is an exploded perspective view of the hinge pin assembly of FIG. 10.
Figure 12:
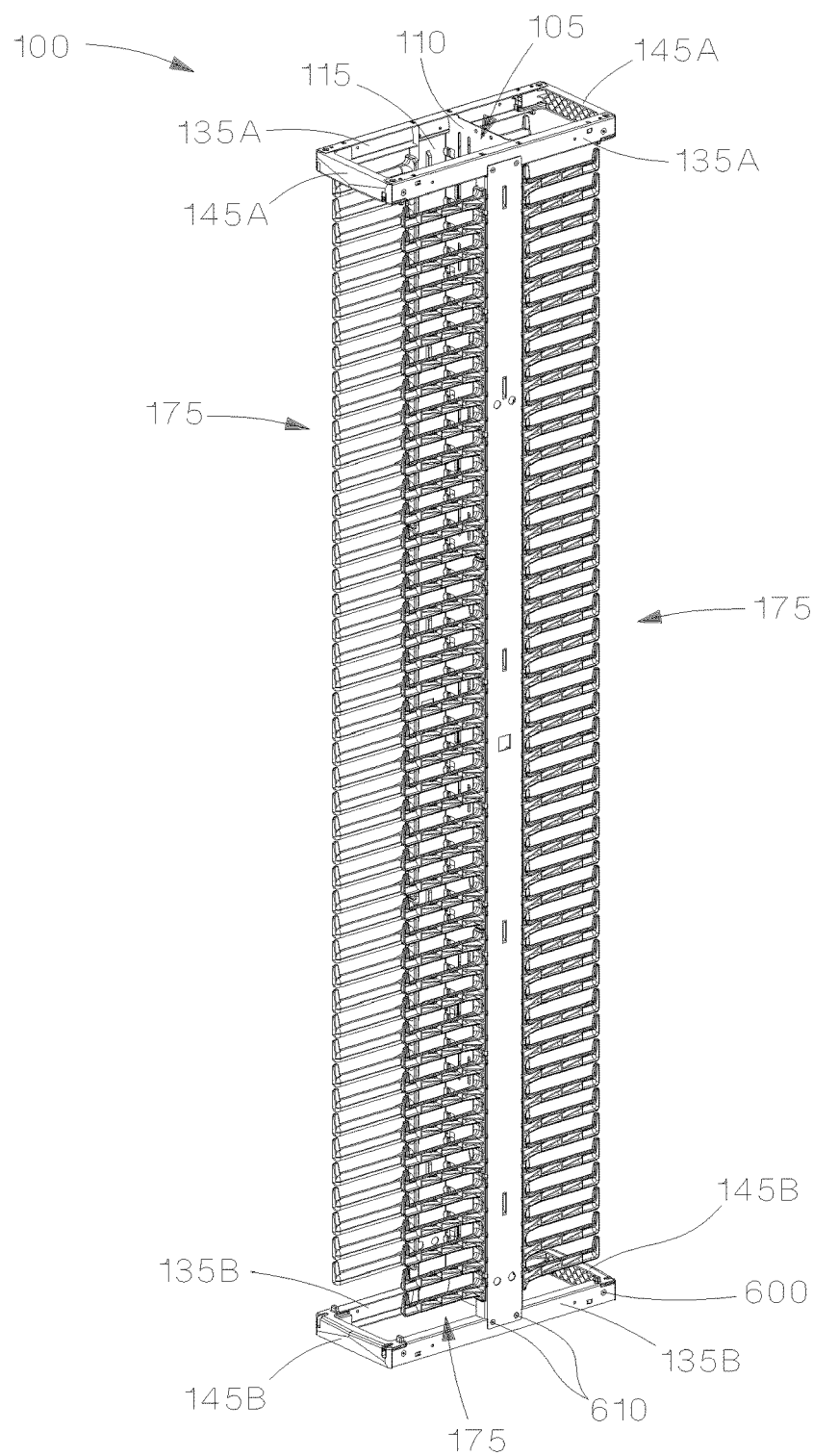
FIG. 12 is a top front perspective view of the base frame of the vertical cable manager of FIG. 1.
Figure 13:
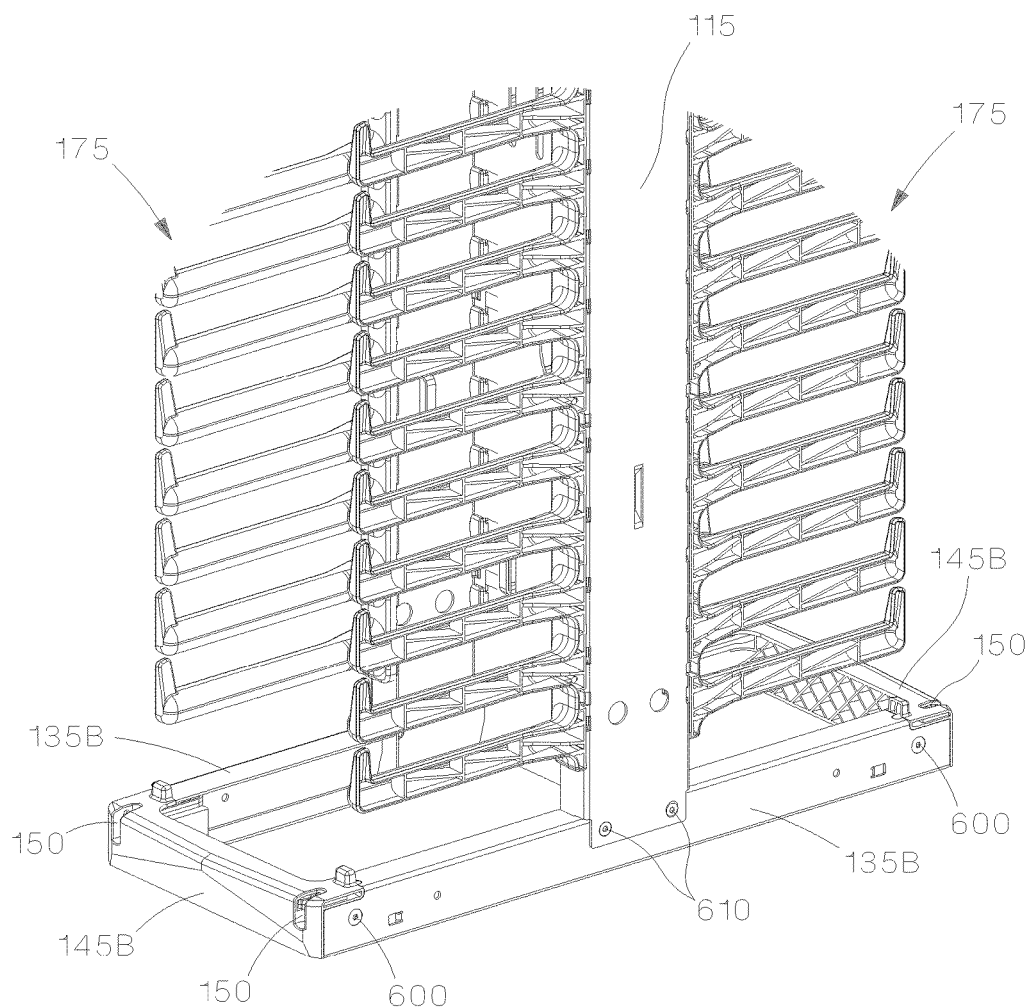
FIG. 13 is an enlarged perspective view of a portion of the base frame of FIG. 12.

Hinge pin assemblies 300 are secured to door panel 205 at corners of door panel 205. As can best be seen in FIGS. 3-5, hinge pin assemblies 300 are secured to door panel 205 such that upper and lower opposing hinge pin assemblies 300 extend and retract in opposite directions. For example, upper hinge pin assemblies retract downward (as shown in orientation of FIGS. 3-5) and lower hinge pin assemblies retract upward (as shown in orientation of FIGS. 3-5). Referring to FIGS. 8, 10, and 11, each hinge pin assembly 300 includes hinge pin receiver 330, which is securable to door panel 205, retractable hinge pin 305, and spring 325. Hinge pin receiver 330 is generally cylindrical and receives spring 325 and hinge pin 305. Hinge pin 305 is partially disposed within hinge pin receiver 330 and extends through hinge pin receiver 330 such that a door post portion 310 of hinge pin 305 is located on one side of hinge pin receiver 330 and a second portion, having a clearance hole 315 to receive splice 410 of cable assembly 400, is located on a second side of hinge pin receiver 330, opposite door post portion 310. Door post portion 310 of hinge pin 305 is received by hinge rod receptacle 150 of crossbars 145A, 145B when door 200 is moved from an open to a closed position, as described in detail below. Spring 325 is disposed within hinge pin receiver 330 between hinge pin receiver 330 and hinge pin 305 to bias hinge pin 305 towards an extended position.

Cable assemblies 400 interconnect upper and lower opposing hinge pin assemblies 300 and engage respective door handle assemblies 500 so that rotation of a door handle assembly 500 retracts hinge pins 305 of respective upper and lower opposing hinge pin assemblies 300, as described in detail below. Each cable assembly 400 is connected at opposite ends to opposing hinge pin assemblies 300. Referring to FIGS. 5, 8-9, and 11, cable assemblies each include cable 405 and splices 410 connected at each end of cable 405. Splices 410 engage hinge pins 305 to connected cable assemblies 400 to hinge pin assemblies 300 and, in the example shown, are Panduit® BS18 butt splices, which can be used for 22-18 AWG wiring.

To connect a cable assembly 400 to a hinge pin assembly 300, a splice 410 of cable assembly 400 is inserted through clearance hole 315 in hinge pin 305 at a non-vertical angle to the longitudinal axis of hinge pin 305 (see FIG. 8). Splice 410 is then rotated until splice 410 is coaxial with hinge pin 305. Overlap tabs 320 on hinge pin 305 have a spacing between them that is smaller than an outer diameter of splice 410 such that overlap tabs 320 trap splice 410 once rotated and act as a push-to-lock feature.

As best seen in FIGS. 6-9, door handle assemblies 500 each include a door handle 505 connected to a door handle backing 515, each positioned on opposite sides of door skin 207. Door handle 505 and door handle backing 515 are mirror images about a longitudinal axis of door 200, which allows the same components to be used on both the left and right side of door 200. Door handles 505 have undercut 507 to allow a user to grip door handle 505 when rotating door handle assembly 500 and pulling on door 200. Door handles 505 extend through apertures 210 in door skin 207 of door panel 205 and have engagement ribs 510 (FIG. 7) that interlock with engagement slots 535 (FIG. 6) of door handle backings 515 so that door handle assemblies 500 each rotate as a singular entity.

Door handle backings 515 are positioned opposite respective door handles 505 and have keys 520 (FIG. 6) that engage with keyed cutouts 215 in door skin 207 of door panel 205 to key the rotation of door handle assemblies 500 in a predetermined direction, which in the example shown is outwards, to retract hinge pins 305.

Figure 6:
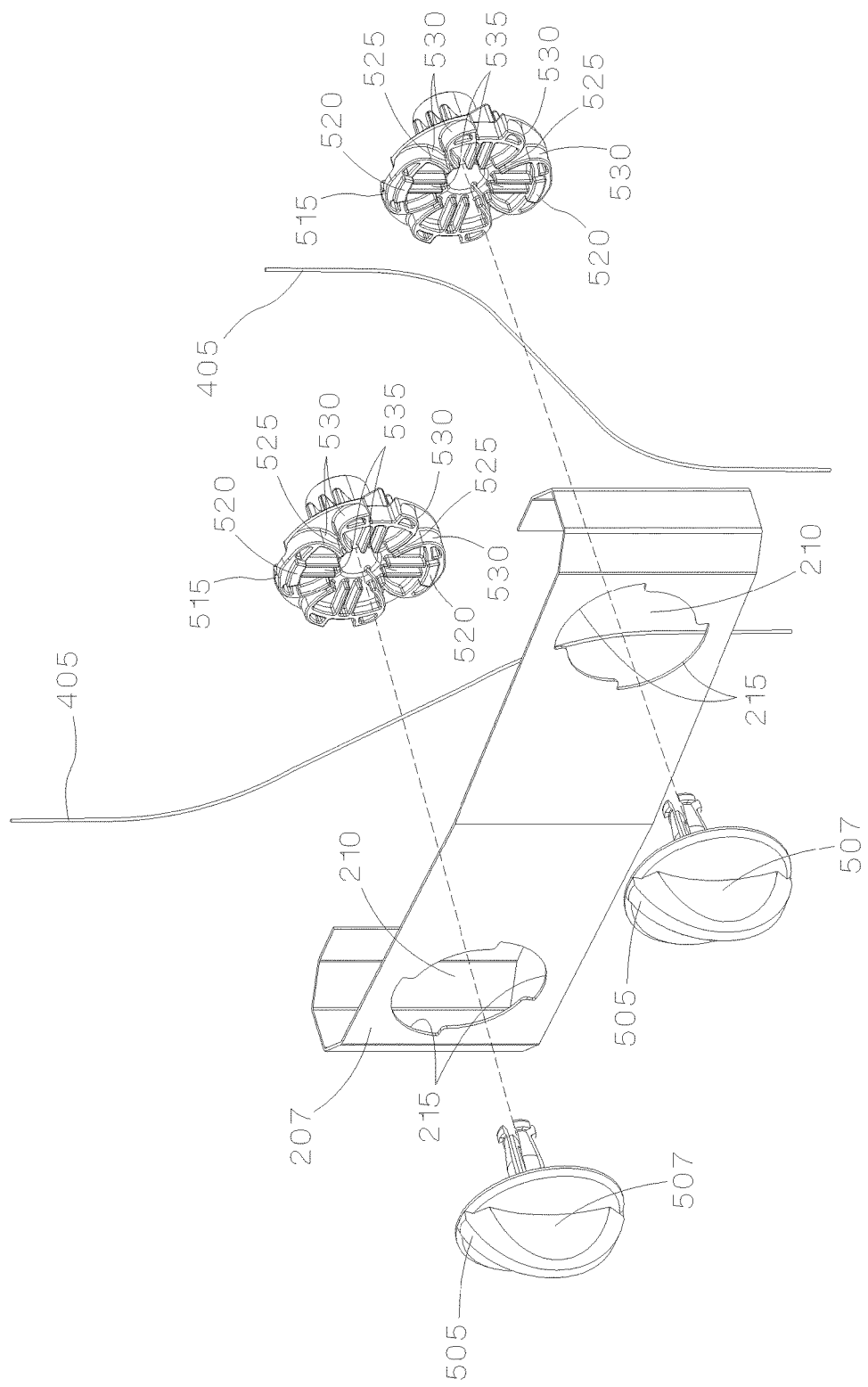
FIG. 6 is an exploded top front perspective view of the door handle assemblies of the door of FIG. 3.
Figure 7:
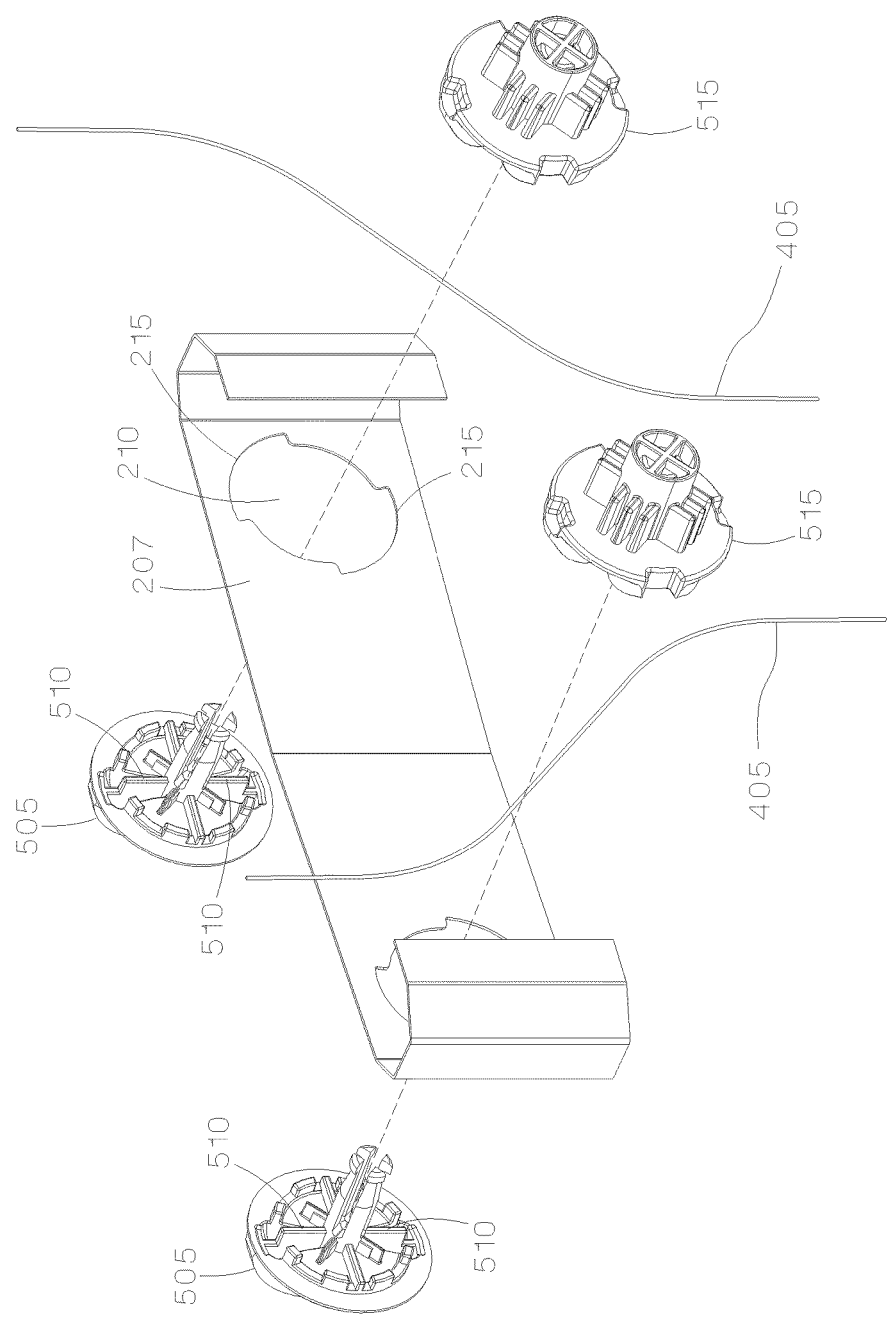
FIG. 7 is an exploded top rear perspective view of the door handle assemblies of FIG. 6.

Cables 405 of cable assemblies 400 extend through a channel 525 in respective door handle backings 515 at an approximately 45° angle relative to the longitudinal axis of door 200 with hinge pins 305 in the extended position. As best seen in FIG. 6, each end of channels 525 has bend radius control sections 530 that provide a bend radius for cables 405 and define the motion of cable 405 when door handle assembly 500 is rotated.

The example vertical cable manager 10 described and shown herein can come in various widths and heights. Varying the height of vertical cable manager 10 can be accomplished through use of different height backbones 105 with additional or larger/smaller cable finger units 175 and corresponding height doors 200. Varying the width of vertical cable manager 10 can be accomplished through use of wider or narrower backbones 105 and corresponding width crossbars 145A, 145B and doors 200. Height and width variations can be combined to create an infinite number of heights and widths.

As can be seen in FIGS. 16 and 21-22, with door 200 in a closed position, hinge pins 305 are in the extended position and catch portions 170 of elastic latch members 155 secure hinge pins 305 in hinge rod receptacles 150, which secures door 200 in the closed position and prevents door 200 from being pulled open. In this state, springs 325 of hinge pin assemblies 300 are under compression to bias hinge pins 305 towards the extended position and provide tension to cables 405 of cable assemblies 400, which forces the vertical alignment of cables 405 and keeps door handle assemblies 500 constrained.

To open one side of door 200, one of the door handles 505 is rotated, which retracts hinge pins 305 on the respective side of door 200, until hinge pins 305 clear latch members 155, allowing door 200 to be pulled open and rotated about hinge pins 305 on the opposite, or closed, side of door 200. Rotation of door handle 505 of door handle assembly 500 moves cable assembly 400 and pulls cable 405 of cable assembly 400 in a direction away from hinge pin assemblies 300, which pulls hinge pins 305 of hinge pin assemblies 300 and moves hinge pins 305 from the extended position to the retracted position to clear latch members 155. Once door 200 has been pulled open, door handle 505 is released, which releases the tension on cable 405 to allow spring 325 to move hinge pin 305 from the retracted position to the extended position.

Figure 17:
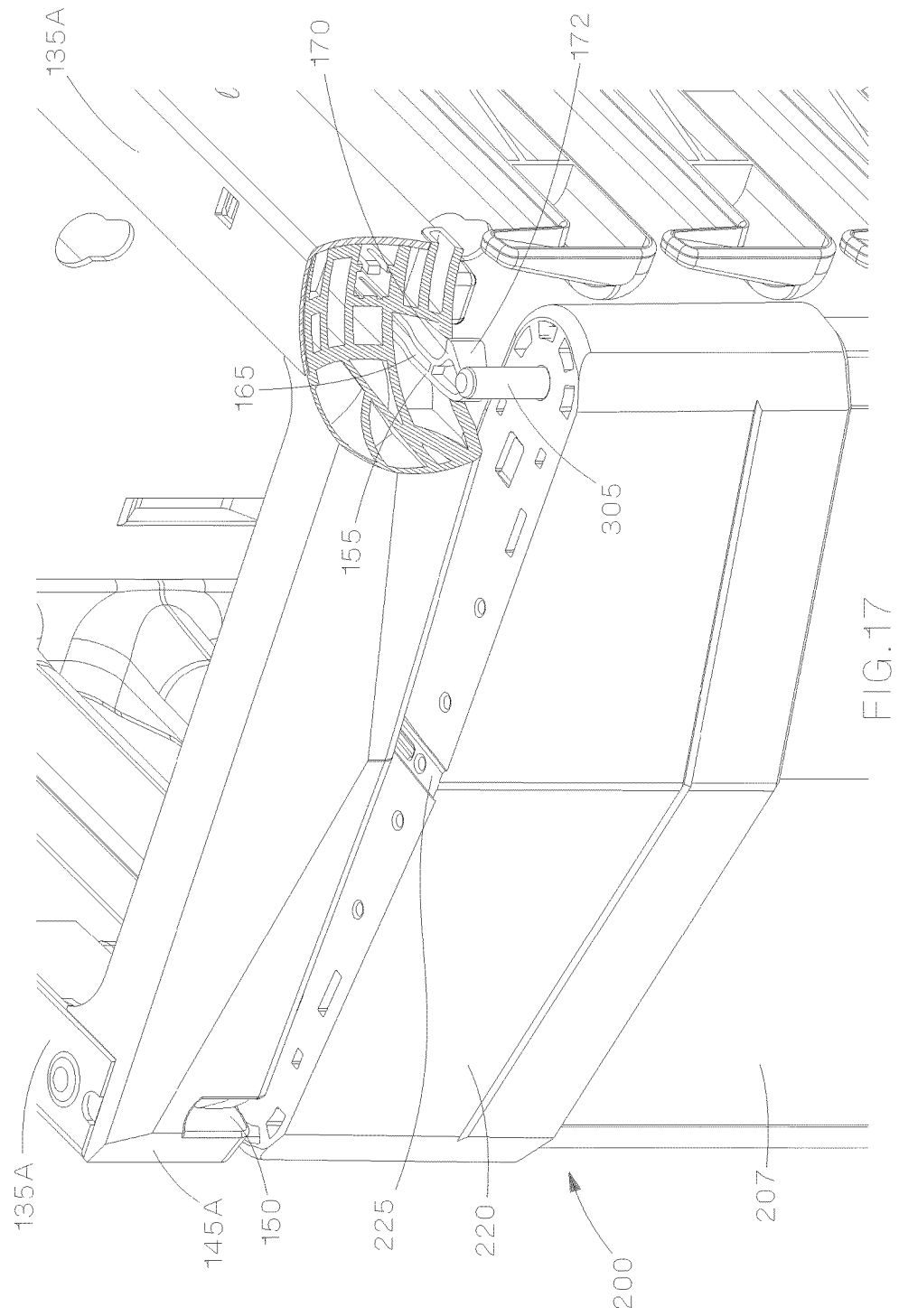
FIG. 17 is an enlarged perspective partial cutaway view of a portion of the vertical cable manager of FIG. 1 with the door in an open position.
Figure 18:
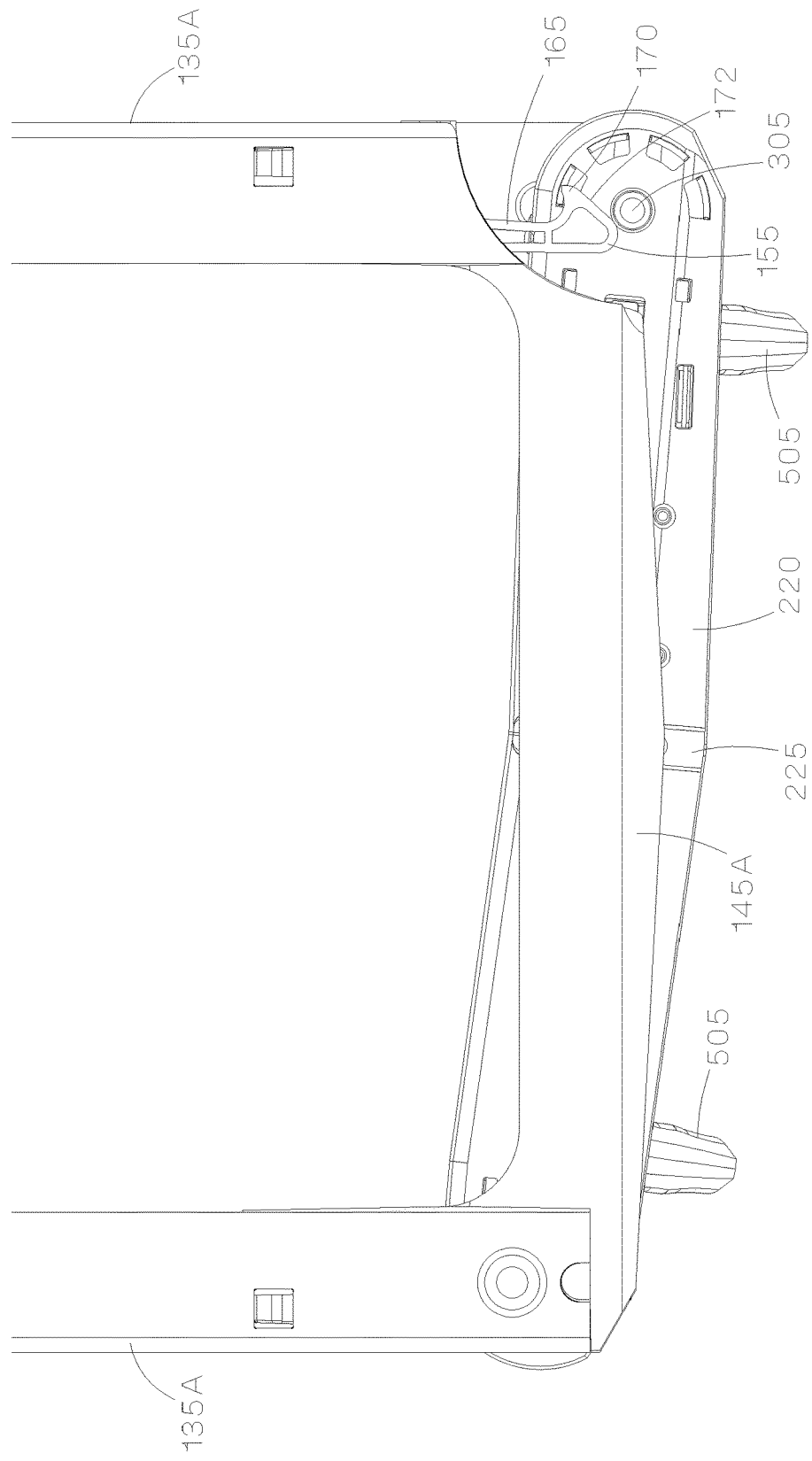
FIG. 18 is a top view of the portion of the vertical cable manager in FIG. 17.
Figure 19:
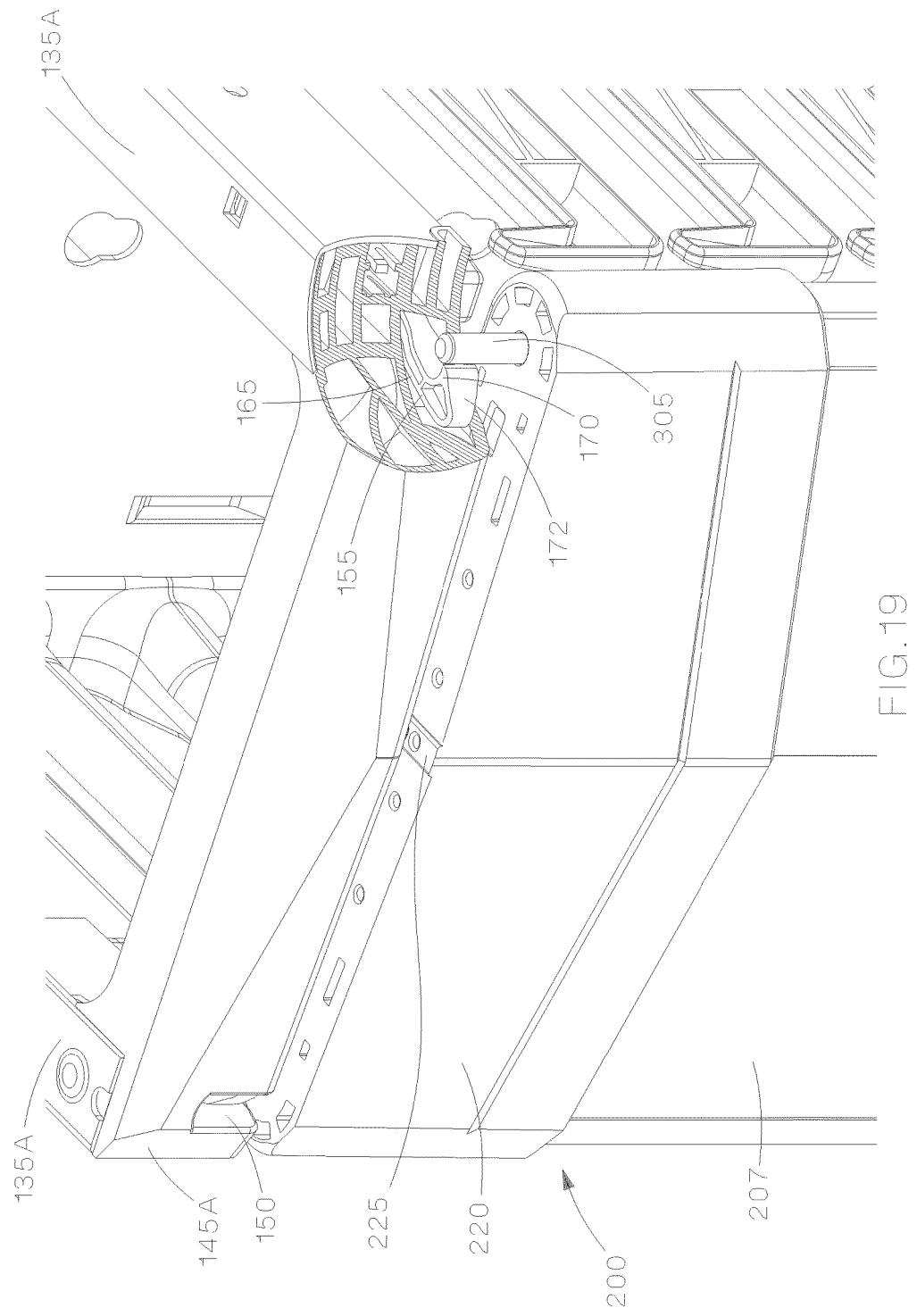
FIG. 19 is an enlarged perspective partial cutaway view of a portion of the vertical cable manager of FIG. 1 with the door in a partially closed position.
Figure 20:
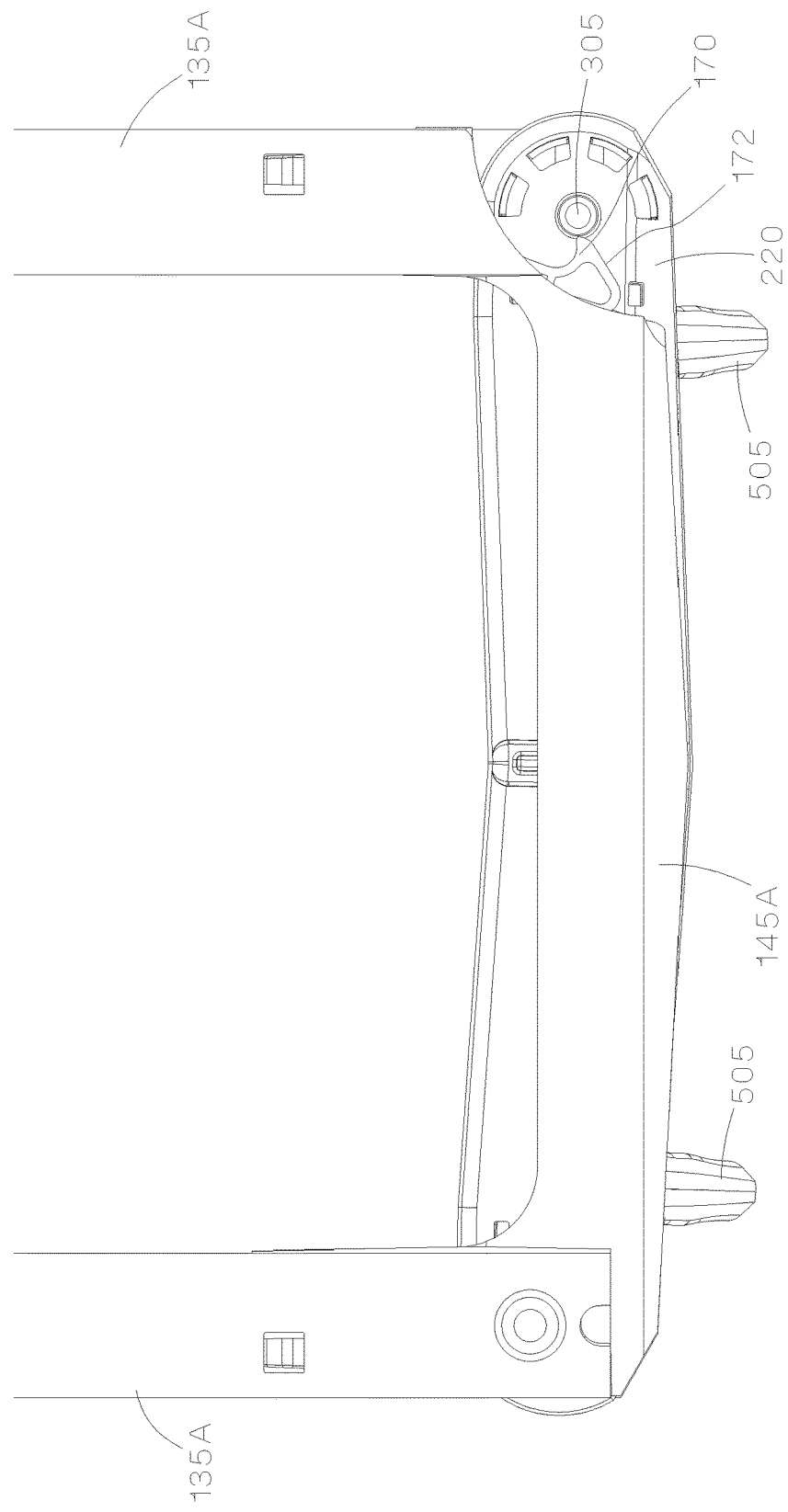
FIG. 20 is a top view of the portion of the vertical cable manager in FIG. 19.

Referring to FIGS. 17-20, to close door 200, door 200 is pushed towards the closed position until hinge pins 305 are received in hinge rod receptacles 150 and engage latch members 155 (FIGS. 17-18). As door 200 is pushed further towards the closed position, each hinge pin 305 continues to travel through hinge rod receptacle 150 and engages angled face 172 of catch portion 170, which extends at an acute angle with respect to flexible arm 165 and the longitudinal axis of latch member 155. Hinge pins 305 slide along angled faces 172, which pushes and deflects catch portions 170 away from hinge pins 305 through elastic deformation of flexible arm 165 (FIGS. 19-20). The deflection of catch portions 170 allows hinge pins 305 to continue to travel through hinge rod receptacles 150 and past catch portions 170 as door 200 is pushed closed and moved from the open to the closed position. When hinge pins 305 move past catch portions 170, catch portions 170 move back to the default or closed position, due to the elasticity of flexible arm 165, such that catch portions 170 secure hinge pins 305 in hinge rod receptacles 150, which secures door 200 in the closed position and prevents door 200 from being pulled open (FIGS. 21-22).

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A vertical cable manager, comprising:
   a base frame comprising a backbone, first and second upper support legs attached to a first end of the backbone, first and second lower support legs attached to a second end of the backbone, opposite the first end, an upper crossbar attached between the first and second upper support legs, and a lower crossbar attached between the first and second lower support legs; and
   a door comprising a door panel and hinge pin assemblies secured to the door panel and positioned at respective corners of the door panel, each hinge pin assembly including a retractable hinge pin; wherein
      the upper and lower crossbars each comprise first and second hinge rod receptacles to receive respective hinge pins and first and second elastic latch members;
      the elastic latch members each comprise a base portion that connects to the crossbar, a flexible arm extending from the base portion, and a catch portion extending from the flexible arm and disposed at a distal end of the flexible arm, opposite the base portion; and
      the catch portions secure the respective hinge pins in the respective hinge rod receptacles with the door in a closed position and are deflectable through elastic deformation of the flexible arm to allow travel of the hinge pins through the hinge rod receptacles and past the catch portions when the door is moved from an open to a closed position.

2. The vertical cable manager of claim 1, wherein the base frame further comprises a cable finger unit mounted on the base frame.

3. The vertical cable manager of claim 2, wherein:
   the base frame comprises a plurality of slots and an aperture; and
   the cable finger unit comprises a plurality of protrusions configured to engage the plurality of slots in the base frame to position the cable finger unit and a flexible snap member configured to engage the aperture in the base frame to secure the cable finger unit to the base frame.

4. The vertical cable manager of claim 2, wherein the cable finger unit comprises a base and a plurality of fingers extending from the base, each finger having a L-shaped configuration.

5. The vertical cable manager of claim 1, wherein the backbone comprises a back panel, a first side panel positioned on a first side of the back panel, and a second side panel positioned on a second side of the back panel, opposite the first side.

6. The vertical cable manager of claim 1, wherein:
   the backbone comprises a plurality of support tabs; and
   the first and second upper support legs and first and second lower support legs each comprises support tab apertures to receive the support tabs.

7. The vertical cable manager of claim 1, wherein opposing retractable hinge pin assemblies retract in opposite directions.

8. The vertical cable manager of claim 1, wherein the door comprises:
   first and second door handle assemblies; and
   first and second cable assemblies, each cable assembly connected at opposite ends to opposing hinge pin assemblies and engaging a respective door handle assembly; wherein
   rotation of the door handle assemblies moves the cable assemblies, which move the retractable hinge pins of respective hinge pin assemblies from an extended position to a retracted position.

9. The vertical cable manager of claim 8, wherein each hinge pin assembly comprises:
   a hinge pin receiver secured to the door panel and configured to receive the retractable hinge pin; and
   a spring disposed within the hinge pin receiver and positioned between a portion of the hinge pin receiver and the retractable hinge pin to bias the retractable hinge pin towards the extended position.

10. The vertical cable manager of claim 8, wherein each cable assembly comprises a cable and splices connected to each end of the cable, wherein the splices engage respective retractable hinge pins to connect the cable assemblies to the hinge pin assemblies and the cable extends through a channel in the door handle assembly.

11. A base frame for a vertical cable manager, the base frame comprising:
   a backbone, first and second upper support legs attached to a first end of the backbone, first and second lower support legs attached to a second end of the backbone, opposite the first end, an upper crossbar attached between the first and second upper support legs, and a lower crossbar attached between the first and second lower support legs; wherein
      the upper and lower crossbars each comprise first and second hinge rod receptacles to receive respective retractable hinge pins of a door and first and second elastic latch members;
      the elastic latch members each comprise a base portion that connects to the crossbar, a flexible arm extending from the base portion, and a catch portion extending from the flexible arm and disposed at a distal end of the flexible arm, opposite the base portion; and
      the catch portions secure the respective hinge pins in the respective hinge rod receptacles with the door in a closed position and are deflectable through elastic deformation of the flexible arm to allow travel of the hinge pins through the hinge rod receptacles and past the catch portions when the door is moved from an open to a closed position.

12. The base frame of claim 11, wherein the base frame further comprises a cable finger unit mounted on the base frame.

13. The base frame of claim 12, wherein:
   the base frame comprises a plurality of slots and an aperture; and
   the cable finger unit comprises a plurality of protrusions configured to engage the plurality of slots in the base frame to position the cable finger unit and a flexible snap member configured to engage the aperture in the base frame to secure the cable finger unit to the base frame.

14. The base frame of claim 12, wherein the cable finger unit comprises a base and a plurality of fingers extending from the base, each finger having a L-shaped configuration.

15. The base frame of claim 11, wherein the backbone comprises a back panel, a first side panel attached on a first side of the back panel, and a second side panel attached on a second side of the back panel, opposite the first side.

16. The base frame of claim 11, wherein:
the backbone comprises a plurality of support tabs; and
the first and second upper support legs and first and second lower support legs each comprises support tab apertures to receive the support tabs.

* * * * *